(12) United States Patent
Meador et al.

(10) Patent No.: US 6,303,744 B1
(45) Date of Patent: Oct. 16, 2001

(54) POLYIMIDES AND PROCESS FOR PREPARING POLYIMIDES HAVING IMPROVED THERMAL-OXIDATIVE STABILITY

(75) Inventors: Mary Ann B. Meador, Strongsville, OH (US); Aryeh A. Frimer, Rehovot (IL)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/535,663

(22) Filed: Mar. 23, 2000

(51) Int. Cl.$^7$ ............... C08G 43/10; C08G 69/26
(52) U.S. Cl. ............ 528/353; 528/125; 528/126; 528/128; 528/172; 528/173; 528/174; 528/176; 528/179; 528/183; 528/188; 528/220; 528/229; 528/350
(58) Field of Search ................... 528/125, 126, 528/128, 172, 173, 174, 183, 188, 176, 179, 220, 229, 350, 353

(56) References Cited

U.S. PATENT DOCUMENTS

| | | | |
|---|---|---|---|
| 3,632,428 | * 1/1972 | Lubowitz et al. | 528/353 |
| 3,745,149 | * 7/1973 | Serafini et al. | 528/353 |
| 4,497,948 | * 2/1985 | Lauver | 528/229 |
| 4,514,557 | * 4/1985 | Lauver | 528/342 |
| 4,739,030 | 4/1988 | Lubowitz et al. | 528/170 |
| 4,742,153 | * 5/1988 | Sutton, Jr. | 528/125 |
| 4,946,890 | * 8/1990 | Meador | 528/353 |
| 5,145,943 | 9/1992 | Li et al. | 528/353 |
| 5,338,827 | 8/1994 | Serafini et al. | 528/353 |
| 5,594,089 | 1/1997 | Lubowitz et al. | 528/171 |
| 5,756,597 | 5/1998 | Lubowitz et al. | 525/432 |
| 5,817,744 | 10/1998 | Sheppard et al. | 528/353 |
| 5,969,079 | 10/1999 | Lubowitz et al. | 528/170 |
| 6,127,509 | * 10/2000 | Pratte et al. | 528/170 |

* cited by examiner

Primary Examiner—P. Hampton-Hightower
(74) Attorney, Agent, or Firm—Kent N. Stone

(57) ABSTRACT

Polyimides and the process for preparing polyimides having improved thermal-oxidative stability derived from the polymerization of effective amounts of one or more of the polyamines such as the aromatic diamines, one or more of the tetracarboxylic dianhydrides and a novel dicarboxylic endcap having a formula selected from the group consisting of:

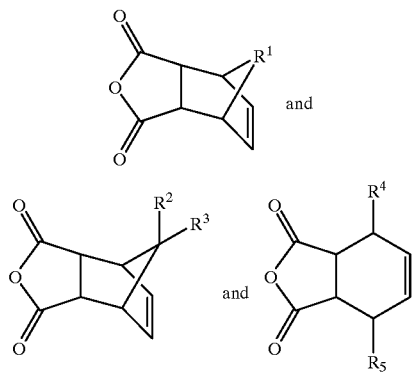

wherein $R^1$ is either a

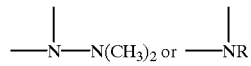

radical where R is either hydrogen or an alkyl radical of 1 to 4 carbons, $R^2$ is either OH, $NH_2$, F, or Cl radical, $R^3$ is either H, OH, $NH_2$, F, Cl or an alkylene radical, $R^4$ is either an alkyl, aryl, alkoxy, aryloxy, nitro, F, or Cl radical, and $R^5$ is either H, alkyl, aryl, alkoxy, aryloxy, nitro, F, or Cl radical. The polyimides are useful particularly in the preparation of prepregs and PMR composites.

22 Claims, No Drawings

POLYIMIDES AND PROCESS FOR PREPARING POLYIMIDES HAVING IMPROVED THERMAL-OXIDATIVE STABILITY

ORIGIN OF INVENTION

The invention described herein was made by an employee of the United States Government and may be manufactured and used by or for the Government for governmental purposes without the payment of any royalties thereon or therefor.

BACKGROUND OF INVENTION

1. Field of the Invention

This invention relates to polyimides having improved thermal-oxidative stability and to the process of preparing said polyimides derived from the polymerization of effective amounts of polyamines, tetracarboxylic dianhydrides and novel dicarboxylic endcaps. More specifically, this invention relates to all types of PMR (polymerization monomeric reactants) polyimides and to the use of these novel polyimides in the preparation of PMR resins and composites. The polyimides are derived from the polymerization of various polyamines, e.g. aromatic diamines, tetracarboxylic dianhydrides and a novel class of dicarboxylic endcaps. These dicarboxylic endcaps were found to substantially increase the lifetime and use temperatures of polyimide matrix composites allowing their use in various engine parts such as inlets, fan ducts, exit flaps etc. for high speed aircraft and the like. Ultimately, the payoff for using these novel polyimides in developing polymer composites that can operate at higher temperatures is the weight savings of 10 to 20% over other engine parts made from conventional materials.

2. Description of Related Prior Art

In structural applications, fiber-reinforced high-temperature polyimide matrix composites offers significant advantages over other materials because of their low density and high specific strength. These composites are attractive for use in aerospace systems, e.g. aircraft engines, airframe, missiles, and rockets, where weight is critical. This weight reduction has substantial benefits in terms of fuel savings, an increased passenger, cargo load, or increased speed and maneuverability. The durability and reliability of materials used in aerospace components is a critical concern. Among the materials requirements for these applications are a high glass-transition temperature, $T_g$, (at least 25° C. higher than the intended use temperature), good high-temperature stability in a variety of environments, and good mechanical properties over a wide range of temperatures. In general, the stability and $T_g$ of most organic polymers limit their use, at best, to applications in which temperatures are not higher than 350 to 370° C.

Addition-curing polyimides were investigated in an attempt to improve the processability of condensation polyimides without adversely affecting their stability and high-temperature performance. The most noteworthy development is the Polymerization of Monomer Reactant (PMR) family of polyimides, in particular PMR-15, developed at the NASA Lewis Research Center. For PMR-15, reinforcement fibers are impregnated with a solution of the dialkyl ester of 3,3",4,4'-benzophenone tetracarboxylic acid (BTDE), methylene dianiline (MDA), and the monoalkyl ester of 5-norbornene-2,3-dicarboxylic acid (NE), in a low boiling solvent, typically methanol or ethanol. In the first step of this process, these monomers undergo imidization at temperatures around 200° C. to yield short-chain norbornene end-capped polyimide oligomers, ($Mw_{theoretical}$=1500 for PMR-15). At temperatures above 300° C., these oligomers undergo a cross-linking reaction involving the norbornene endcap.

In the PMR system, melt viscosity and resin flow can be controlled, to some extend, by varying monomer stoichiometry, which enables the removal of volatile by-products produced in the condensation reaction and leads to composites with fairly low-void contents. PMR-15 has a $T_g$ after post-cure of 365° C. and has good retention of mechanical properties and low weight losses in air for long exposure times (>10,000 h) at temperatures up to 230° C. and for shorter times at temperatures as high as 316° C. While norbornene end-caps have been used successfully in a number of polyimide systems, there are some drawbacks to their use. The thermal-oxidative stability of the norbornene ring is poor due to the large amount of saturated carbons present in this structure. For this reason, the norbornene end-cap and the structures that result from its cross-linking often become the oxidative weak link in polyimides in which it is used. In addition, processing problems can be encountered with norbornene end-capped polymers due to the potential for formation of cyclopentadiene during cross-linking. These deficiencies have prompted the search for new addition-curable end-caps for polyimides.

For example, Jones and co-workers (Jou. Of Polymer Science, Chem. Ed. 33:767–70.) utilized the Diels-Alder cycloaddition between bis(furyl)imide and BMI to produce polyimide. The authors postulate that dehydration occurs between 204 and 288° C., thus leading to a more stable polyimide. Carbon fiber-reinforced composites processed at 400° F., and post-cured at 600° F. had good initial flexural strength at room temperature (123.5 Ksi) and at 600° F. (127.5 Ksi). These composites had modest thermal-oxidative stability; samples aged in air for 1000 hours at 316° C. had an 18% weight loss. Flexural strength of these composites dropped from 172 to 66 Ksi after aging under these conditions.

In the prior art, U.S. Pat. No. 4,739,030 (H. R. Lubowitz et al.) discloses difunctional, crosslinking end-cap monomers useful in the synthesis of high performance oligomers that contain polysulfone or polyethersulfone backbones. The difunctional end-cap monomer useful in the preparation of oligomers are resistant to organic solvents comprise various imidophenols that contain the norbornene group. U.S. Pat. No. 5,594,089 (H. R Lubowitz et al.) discloses linear or multidimensional heterocycle or heterocycle sulfone oligomer having two or four crosslinking sites at each end of its backbone. The multiple chemically functional end cap monomers include organic compounds containing the norbornene group. U.S. Pat. Nos. 5,756,597; 5,817,744; and 5,969,079 (H. R. Lubowitz et al.) further disclose resins that are improved by forming four crosslinks at each addition polymerization site in the backbone of the resin using crosslinking functionalities of a general formula which contain the norbornene group.

U.S. Pat. No. 5,145,943 (J. Y. Lee et al.) discloses polyimides derived from 4,4'-methylenedianiline (MDA), 3,3',4,4'-benzophenonetetracarboxylic acid methyl ester (BTDE), and 5-norbornene-2,3-dicarboxylic acid methyl ester (NDE) with molar ratio of 3:2:2. U.S. Pat. Nos. 3,745,149 and 5,338,827 (Serafini et al.) disclose polyimides prepared by the reaction of a mixture of monomers comprising dialkyl ester of an aromatic tetracarboxylic acid, an aromatic diamine, and a monoalkyl or dialkyl ester of a dicarboxylic acid where the ratio is n:(n+1):2, wherein n has a value of from 1 to 20. Patentees disclosed polyimides that can be processed from a mixture of monomeric reactants using lower alcohols to esterify an anhydride endcap and an aromatic dianhydride. These monomeric reactants when combined with an aromatic diamine form a monomeric mixture which at high temperature polymerize to a polyimide. This procedure was the evolution of the terminology PMR (polymerization of monomeric reactants).

SUMMARY OF THE INVENTION

This invention relates to novel compositions of matter and to the process of preparing said compositions and specifically to the preparation of novel polyimides by the PMR process. These novel polyimides have improved thermal-oxidative stability and are derived from the polymerization of effective amounts of at least one polyamine, at least one tetracarboxylic dianhydride and novel dicarboxylic endcaps having a formula selected from the group consisting of:

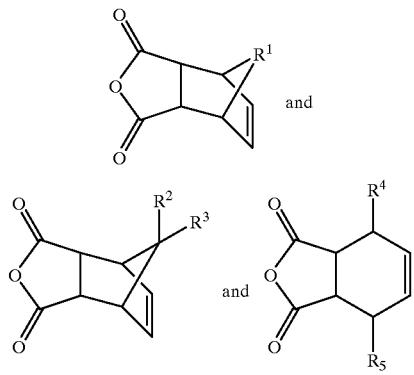

wherein $R^1$ is selected from the group consisting of —N—N(CH$_3$)$_2$ and —NR where R is either hydrogen or an alkyl radical of 1 to 4 carbons, $R^2$ is selected from the group consisting of —OH, NH$_2$, F and Cl radicals, $R^3$ is selected from the group consisting of H, OH, NH$_2$, F, Cl, and lower alkylene radicals, $R^4$ is selected from the group consisting of alkyl, aryl, alkoxy, aryloxy, nitro, F, and Cl radicals, and $R^5$ is selected from the group consisting of H, alkyl, aryl, alkoxy, aryloxy, nitro, F, and Cl radicals.

Accordingly, it is an object of this invention to provide latent reactive carboxylic endcaps as replacements for the norbornene-endcap in the preparation of polyimides.

It is another object of this invention to provide novel carboxylic endcaps that preserve the desired processability of norbornene endcaps in the preparation of PMR polyimide resins.

It is another object of this invention to provide novel endcaps that oxidize in a controlled manner to increase the long term stability in comparison to norbornene-endcaps in the preparation of polyimides.

It is a further object of this invention to provide novel endcaps in the preparation of void-free polyimide composites.

It is still a further object of this invention to provide novel endcaps that allows the use of higher temperatures and prolongs the life of PMR polyimides used in the preparation of composites.

It is still a further object of this invention to provide novel endcaps in the preparation of polyimide prepregs without adversely affecting the processability of PMR composites.

These and other object of this invention will become apparent from a further and more detailed description of the invention as follows.

DESCRIPTION OF THE PREFERRED EMBODIMENTS

This invention relates to polyimides having improved thermal-oxidative stability and to the process of preparing said polyimides and the use thereof in preparing polyimide composites which comprises polymerizing at least one polyamine e.g. an aromatic diamine with at least one tetracarboxylic dianhydride and novel dicarboxylic endcaps. Some of the tetracarboxylic dianhydrides are preferably selected from the group consisting of 3,3',4,4'-benzophenone tetracarboxylic dianhydride (BTDA); 1,1,1,3,3,3-hexaflurorisopropylidene bisphthalic acid dianhydride (HFDA or 6FDA); 1,2,4,5-pyromellitic dianhydride (PMDA); 3,3',4,4'-oxydiphthalic dianhydride (OPDA) and 3,3',4,4'-biphenyltetracarboxylic dianhydride (BPDA) and the corresponding lower diester-diacid and the diester-diacids of other aromatic dianhydride acids such as BTDA, 6FDA, PMDA, ODPA, and BPDA. These dianhydrides and esters thereof and methods for their preparation are known in the art and are specifically disclosed in U.S. Pat. No. 3,745,149 and U.S. Pat. No. 3,856,752; the disclosure of which are hereby incorporated herein. In preparing the polyimide, various polyfunctional aromatic amines, including the diamines, triamines and tetraamines and mixtures thereof are polymerized with the tetracarboxylic dianhydrides and the carboxylic endcap.

It is an object of this invention to use the novel latent reactive carboxylic endcaps as a replacement for the norbornene-endcap (NE) which are presently being extensively utilized in high temperature polymers for preparing composite. NE serves to control molecular weight during oligomerization and, at elevated temperatures, crosslinks to form a stable network structure. Moreover, NE is important to the processability of high temperature resins because it does not give off volatile by-products during final cure and, therefore, allows the production of void-free composites. However, NE is the oxidative weak link in addition polymers used in preparing composite. For example, it limits the use of norbornene endcapped polyimide matrices to 315° C. temperatures for lifetimes up to 1000 hours. This invention provides a class of replacement carboxylic endcaps that preserve the desired processability of NE. Moreover, the novel endcaps oxidize in a controlled process to increase the long term stability over that of the NE. Hence, the use temperature can be raised and/or lifetimes can be prolonged.

More specifically, polyimides are polymers composed of alternating units of diamine and dianhydride, linked to each other via imide bonds. These high temperature polyimides are used to prepare matrix composites used in the cooler parts of aircraft engines because of their high specific strength and lower density compared to other materials such as metals. PMR polyimides, commonly used in the aerospace industry, are generally capped at each end by a norbornenyl endcap which serves a double function: (1) it limits the average molecular weight of the polymer chains (oligomers), thereby allowing flow and improving processibility; (2) upon further treatment (curing), the endcap crosslinks the double bond into a tough heat-resistant component; see Scheme I.

SCHEME 1

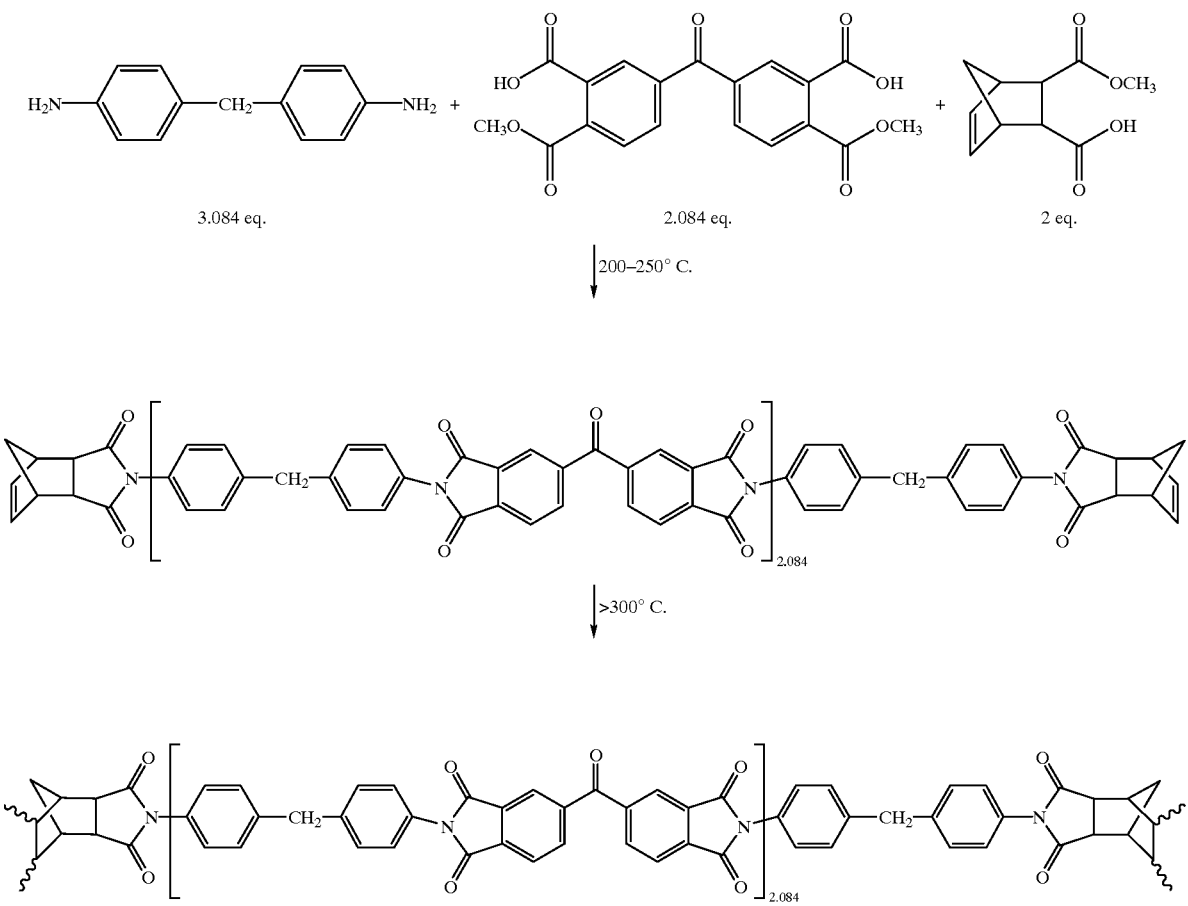

Scheme 1

Scheme 1 is the typical reaction for addition polyimides (PMR-15) capped with a prior art norbornene endcap. However, it is this very endcap, so important to processing, that accounts for much of the weight loss in the polymer on aging in air at elevated temperatures. Thus, the endcap limits the use of PMR polyimides to lower temperature parts of the engine and/or shorter lifetimes. Understanding this degradation provided the clues for designing new endcaps to slow down degradation, and prolong the lifetime of the material. The poor thermo-oxidative stability of the endcap is a known problem. Researchers have tried to improve the stability by a variety of means, but most prominently by utilizing structures with more aromatic character, e.g. Cycap, V-cap, PEPA, acetylene terminated imides(ATI), benzocyclobutenes and biphenylenes (see: M. A. Meador, Annual Review in Material Sciences, 1998, 28:599–630). However, each modification resulted in changes in the nature of the crosslinking and undesirable changes in processibility (e.g., V-cap and ATI both crosslink at a considerably lower temperature—during imidization—and cause early gelation), and/or mechanical behavior (e.g., in the case of PEPA, the Tg is considerably lower). There also is a sizable increases in cost (e.g., Cycap). The oxygen-bridged analogues of the norbornene endcap have been considered; see E. A. Burns, R. J. Jones, and W. P. Kendrick, Final Report, NASA CR-72633, 1970. Unfortunately, this struc-ture favors retro-Diels-Alder reaction over crosslinking through the double bond, and therefore does not give the same type of crosslinked structure. Further, 1,2,3,6-tetrahydrophthalic anhydride was considered as an endcap for polyimide adhesives; see A. K. St. Clair and T. L. St. Clair Polym. Eng. Sci. 1982, 22, 9–14, but the crosslinking temperature was too high (>415° C.).

The primary purpose of the present invention is to lower the amount of weight loss and the thermo-oxidative aging of PMR-polymers over their lifetime that results from the facile degradation of the nadic endcap. Previous work on the aging of PMR-15 revealed that the degradation of the nadic endcap occurs (as shown in Scheme 2) via two primary pathways. Path A, degradation proceeds through initial scissions and oxidative opening of the norbornyl ring to form a 1-hydroxy substituted maleimide (1). Path B, degradation proceeds through oxidation of the bridging methylene of the norbornyl moieties followed by carbon monoxide extrusion. Aromatization of the resulting biradical leads to substituted phthalimides (3) and related secondary degradation products. Path A, oxidation products (2) are cleavage products that are most likely formed concomitant with large amounts of weight loss in the polymer system. In contrast, structures (3) and (4) from path B are more oxidatively stable and form with very little weight loss. Therefore, new endcap structures which more strongly favor path B degradation will lead to lower weight loss in addition polyimides, and result in less shrinkage and cracking in the oxidation layer.

SCHEME 2

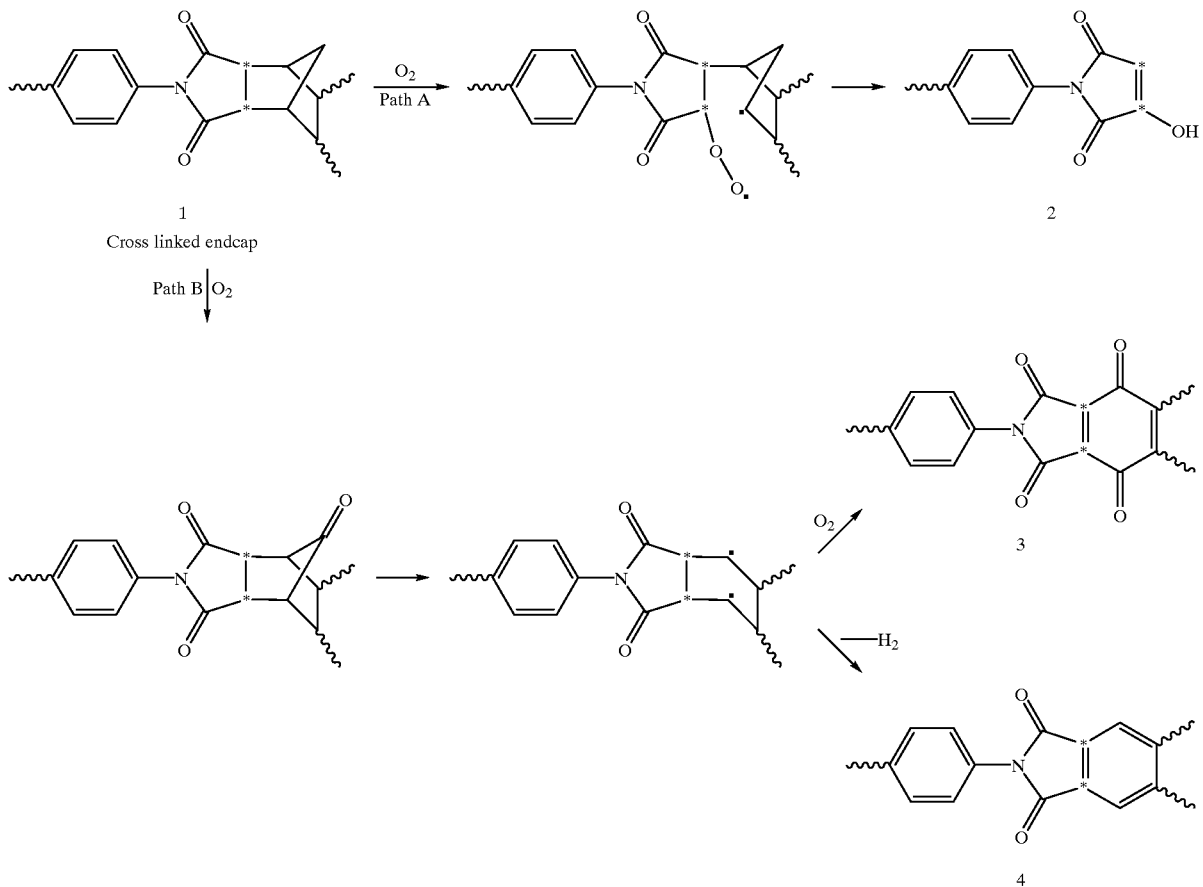

1
Cross linked endcap

Scheme 2 shows that degradation of norbornenyl endcap follows two pathways. Path A results in cleavage of the crosslinks and weight loss. Path B results in more stable aromatic structures. Hence, path B degradation is more desired.

Accordingly, the present invention is directed to a class of new endcaps, illustrated by structures in scheme 3, which exclusively or primarily follow path B degradation. In these structures, some examples of which are shown in scheme 3, maintain stability during imidization (200° C.) and crosslinking (315° C.). Nevertheless, following these critical steps, it is spontaneously converted upon aging to thermally stable capping group.

SCHEME 3

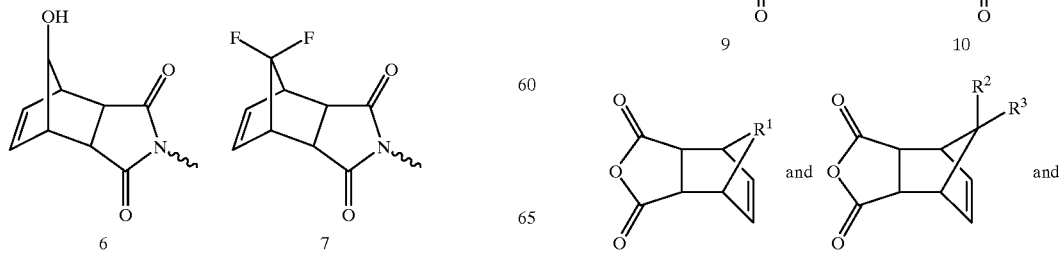

-continued

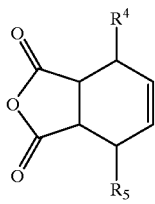

wherein $R^1$ is selected from the group consisting of —N—N$(CH_3)_2$ and —NR where R is either hydrogen or a lower alkyl radical of 1 to 4 carbons, $R^2$ is selected form the group consisting of —OH, $NH_2$, F and Cl radicals, $R^3$ is selected from the group consisting of H, OH, $NH_2$, F, Cl and lower alkylene radicals having 2 to 4 carbons, $R^4$ is selected from the group consisting of alkyl, aryl, alkoxy, aryloxy, nitro, F, and Cl radicals, $R^5$ is selected from the group consisting of H, alkyl, aryl, alkoxy, aryloxy, nitro, F, and Cl radicals, wherein the alkyl and alkoxy radicals have 1 to 4 carbon atoms, the aryl and aryloxy have 6 to 8 carbons, and the alkylene radicals have 2 to 6 carbons.

Many of the above compounds can be derived from 7-oxonadic anhydride, (Scheme 4). In this molecule, the carbonyl bridge itself is too labile to survive imidization, since loss of CO occurs readily at temperatures as low as 140° C. However, this molecule provides a simple synthesis of many suitable candidates The 7-hydroxynorbornene diacid, oxidizes more easily to the carbonyl on aging in air and leads to path B products. In the 7,7-difluoro derivative, the electron withdrawing power of the flourines weaken the neighboring carbon bonds which also favors path B degradation.

1979, 44, 604–609], and is easily reduced to the diacid in near quantitative yield.

A unique feature of the present invention is not, as others have tried in the past, to design an endcap that will be inherently more stable than the nadic endcap. As previously stated, this does not work because the nature of the crosslinking changes in ways that either hurt the processability or detrimentally change the mechanical properties of the resulting polymer. Rather, the present invention controls the known degradation of the nadic endcap thermo-oxidative aging by designing nadic derivaties which strongly favor degradation through path B—aromatization to more oxidatively stable substituted phthalimides—which occurs with very little weight loss. The present invention carefully considered how the substitution affects initial crosslinking. Examples given have crosslinking exotherms, by differential scanning calorimetry, similar to the parent nadic endcap. In addition, crosslinking proceeds through the double bond the same as nadic, giving an identical crosslink skeleton. Hence, Tg and other physical properties are similar to polymers containing NE. The main advantage of preserving the same crosslinking scheme and physical properties as nadic while controlling the degradation is faster industry acceptance of the resulting new polymer as a matrix material for composites applications where higher use temperatures or longer lifetimes are desired.

The commercial potential of this invention is quite high. The replacement endcaps could substantially increase the lifetime and use temperatures of polymer matrix composites, allowing for use in engine parts such as inlets, fan ducts and exit flaps for high speed aircraft. Ultimately, the payoff for developing polymer composites that can operate in higher temperature environments is weight savings e.g. from —10–20% over the engine part made with conventional materials like titanium. In addition, since the new endcaps preserve the desired processability as NE, no unconventional methods and or new equipment is needed to utilize the invention.

SCHEME 4

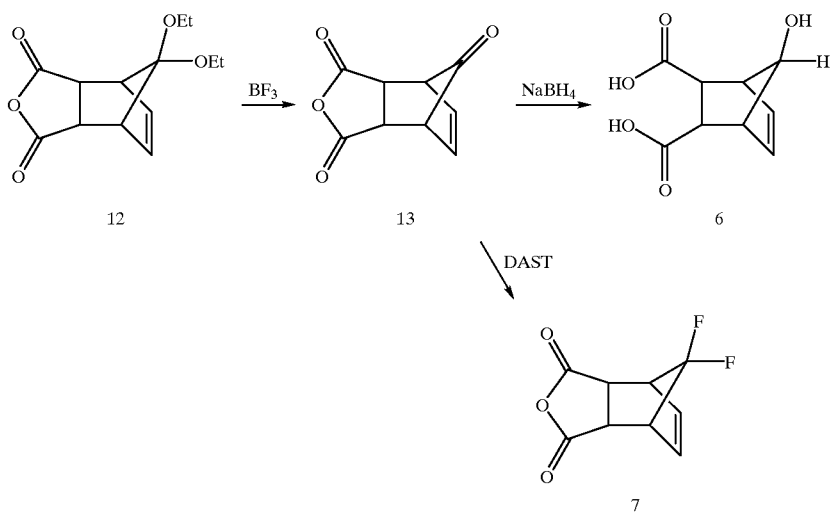

An example for the synthesis of a suitable replacement endcap is 7-hydroxynorbornene-4,5-dicarboxylic acid. Oxonorbonenedicarboxylic anhydride, is made according to the method of Fuchs [Fuchs, B.; Scharf, G. J. Org. Chem.

The carboxylic endcaps of this invention are useful as a replacement in the original PMR (Polymerization of Monomer Reactants) technology for producing large void free polyimide fiber composites. The principal resin in the PMR family, PMR-15, is commercially available and is regarded as the industry standard for aircraft engine applications for long term use at temperatures ranging up to 500° F. The PMR-15 components are currently being used in both military and commercial aircraft engines, and the use of the novel carboxylic endcaps would substantially improve the oxidative stability of these aircraft components.

The following are some specific examples of prior art tetracarboxylic acid dianhydrides that can be used for practicing this invention which includes:

2,3,3',4'-benzophenonetetracarboxylic acid dianhydride
3,3',4,4'-bensophenonetetracarboxylic acid dianhydride
2,2',3,3'-benzophenonetetracarboxylic acid dianhydride
3,3',4,4'-biphenyltetracarboxylic acid dianhydride
2,2',3,3'-biphenyltetracarboxylic acid dianhydride
4,4'-isopropylidenediphthalic anhydride
3,3'-isopropylidenediphthalic anhydride
4,4'-oxydiphtalic anhydride
4,4'-sulfonyldiphthalic anhydride
3,3'-oxydiphthalic anhydride
4,4'-methylenediphthalic anhydride
4,4'-thiodiphthalicanhydride
4,4'-ethylidenediphthalic anhydride
hexafloroisopropylidene bisphthric anhydride (6FOA),
phenyltrifluoroekylidene bisphthalic anhydride (3ROA),
2,3,6,7- naphthalenetetracarboxylic acid dianhydride
1,2,5,6- naphthalenetetracarboxylic acid dianhydride
benzene-1,2,3,4,-tetracarboxylic acid dianhydride
pryazine-2,3,5,6-tetracarboxylic acid dianhydride
thiophene-2,3,4,5-tetracarboxylic acid dianhydride, and the various
lower alkyl esters thereof The preferred polyfunctional amines are the aromatic diamines containing at least one benzene ring which includes:

para-phenylenediamine
meta-phenylenediamine
4,4'-diamino-diphenylpropane
4,4'-diamino-diphenylmethane benzidine
4,4'-diamino-diphenyl sulfide
4,4'-diamino-diphenyl sulfone
3,3'-diamino-diphenyl sulfone
4,4'-diamino-diphenyl ether
1,5-diamino-naphthalene
3,3'-dimethoxy benzidine
3-methylheptamethylene diamine
4,4'-dimethylheptamethylene diamine
2,11-diamino-dodecane
bisaniline
bisaniline-m-xylidene
bisaniline-p-xylidene
3,3'-diaminobenzophenone
4,4'-diaminobenzopheneone
3,3'-diaminodiphenylether
3,4'-diaminodiphenylether
4,4'-diaminodiphenylmethane
2,2'-dimethylbenzidine
3,3'-dimethyl benzidine etc.
and triamines such as
1,3,5-triaminobenzene
2,4,6-triamino-s-triazine
4,4',4"-triaminotriphenylmethane
4,4',4"-triaminotriphenylcarbinol The polyimides of this invention are prepared from mixtures of polyimide-forming monomers which consist essentially of about N moles of the tetracarboxylic dianhydride, N+1 moles of the aromatic diamine and about 2.0 moles of the carboxylic endcap of this invention wherein the value of N ranges from about 2 to 30. The monomeric mixture of polyimide-forming monomers is heated at temperatures ranging from about 200° to 400° C. For purposes of this invention the term carboxylic endcap as used herein includes the carboxylic anhydrides and the lower $C_1$–$C_6$ primary and secondary alkyl esters and ester-acids thereof, wherein $R^1$, $R^2$, $R^3$, $R^4$ and $R^5$ are radicals as defined herein. Specifically, the present invention is directed to a class of novel carboxylic endcaps of structures shown above, comprising nadic endcaps modified in the 7-position with $R^1$, $R^2$, and $R^3$ substituents, and the 3-substituted or 3,6 di substituted 1,2,3,6-tetrahydrophthalic anhydride which primarily follow path B degradation.

The following examples illustrate the improved thermal-oxidative stability of polyimides obtained by using the novel carboxylic endcaps of this invention.

EXAMPLE 1

Imidized 1500 molecular weight molding powdersand crosslinked neat resin disk from 7-hydroxy-5-norbornene-2,3-dicarboxylic anhydride, HNA. HNA (3.6, 20 mmole), 3,3'4,4'-benzophenonetetracarboxylic dianhydride, BTDA (6.72 g, 20.84 mmole and 4,4'-methylenedianiline, MDA (6.11 g 30.84 mmole) were ground together with mortar and pestle to give an intimate mixture of the three monomers. The off-white powder was imidized in an air circulating oven at 200° C. for 2 hours followed by an additional half hour at 230° C. The yellow solid was finely ground with mortar and pestle to give a powder that was fully imidized, as evidenced by NMR and FT-IR. Compression molding of the powder at 300° C. for 1 hour gave a neat resin disk with good consolidation. The following illustrates the polymerization.

EXAMPLE 1

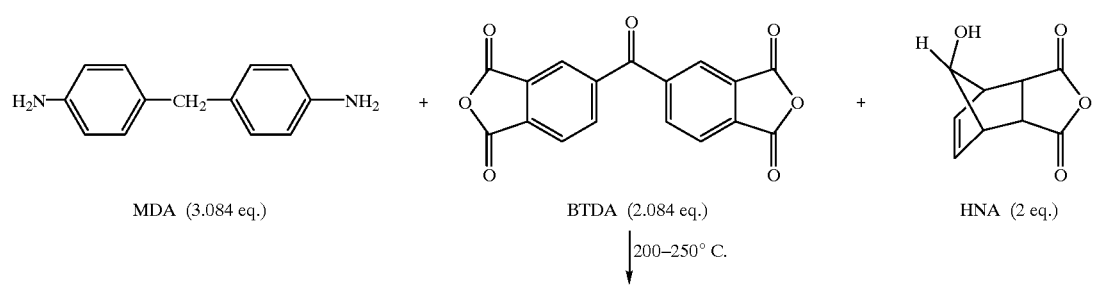

MDA (3.084 eq.)    BTDA (2.084 eq.)    HNA (2 eq.)

200–250° C.

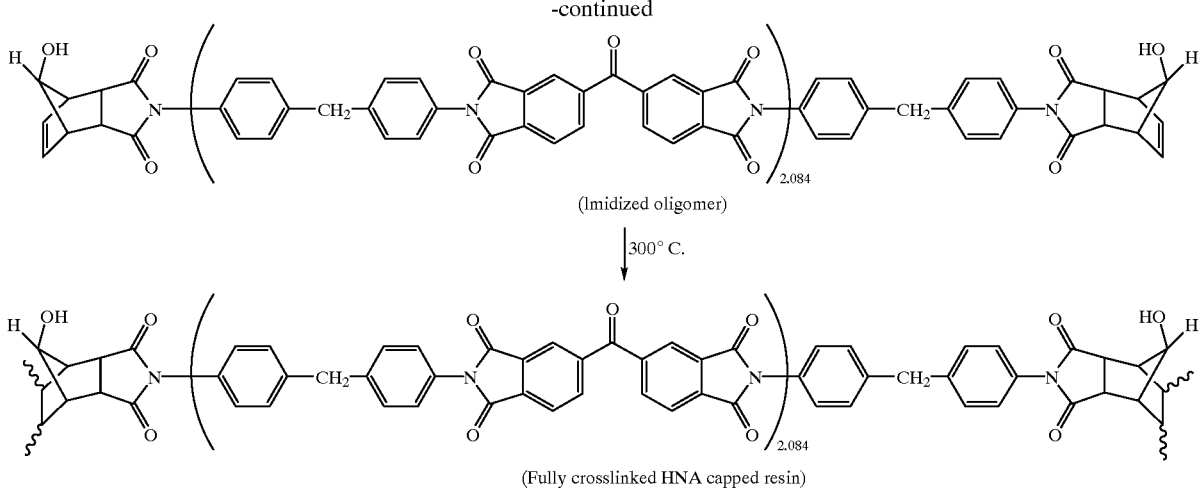

(Imidized oligomer)

↓ 300° C.

(Fully crosslinked HNA capped resin)

EXAMPLE 2

Imidized 1500 molecular weight molding powders and crosslinked neat resin disk from 7-hydroxy-5-norbornene-2,3-dicarboxylic monomethyl ester acid, HNE. Alternatively, HNA (3.60, 20 mmole) and BTDA (6.72 g, 20.84 mmole) was refluxed for 2 hours in 250 ml methanol to give the corresponding ester acids. The resulting clear solution was cooled, and 4,4'-methylenedianiline, MDA (6.11 g 30.84 mmole) was added and stirred to dissolve (approximately 30 minutes.) The methanol was removed from the resulting yellow solution by rotary evaporation at 35° C. to give a yellow foam. The foam was gently crushed to a coarse solid which was imidized in an air circulating oven at 200° C. for 2 hours followed by an additional half hour at 230° C. The yellow solid was finely ground with motor and pestle to give a powder that was fully imidized and identical to the molding powder produced in Example 1, as evidenced by NMR and FT-IR. Compression molding of the powder at 300° C. for 1 hour gave a neat resin disk with good consolidation.

EXAMPLE 3

Imidized 1500 molecular weight molding powders and crosslinked neat resin disk from 7,7-diflouro-5-norbornene-2,3-dicarboxylic anhydride, DFNA. Following the same procedure as Example 1, molding powders and crosslinked neat resins can be synthesized starting with DFNA (4.00 g 20 mmole) in place of the HNA.

EXAMPLE 4

Imidized 1500 molecular weight molding powders and crosslinked neat resin disk from 7,7-diflouro-5-norbornene-2,3-dicarboxylic monomethyl ester acid, DFNE. Following the same procedure as Example 2, molding powders and crosslinked neat resins can be synthesized starting with DFNA (4.00 g, 20 mmole) in place of the HNA. The following illustrates the polymerization.

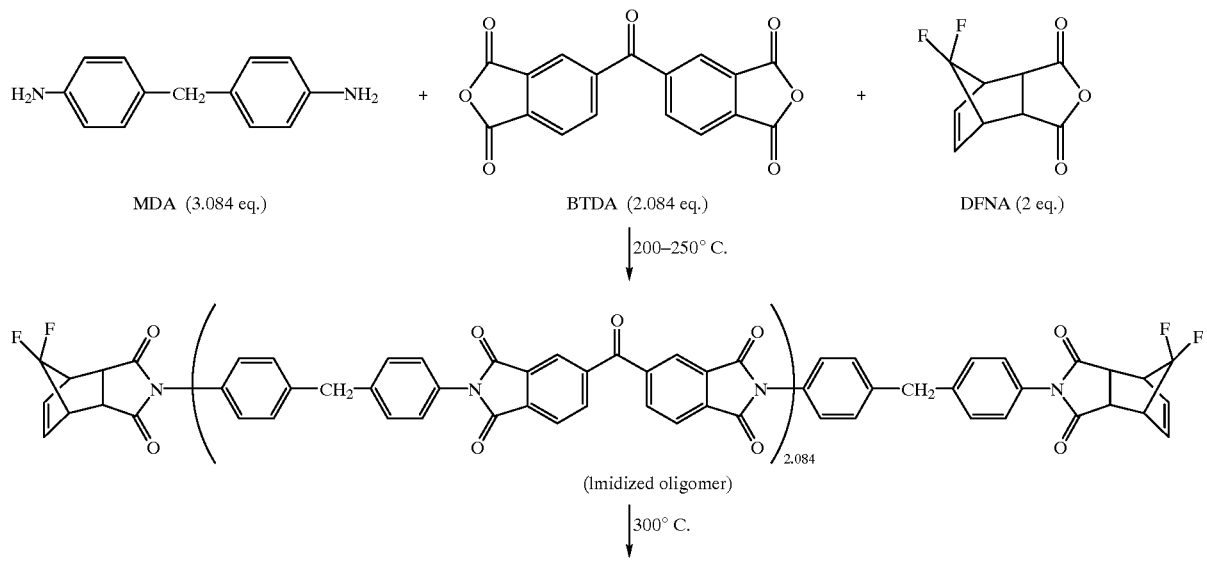

MDA (3.084 eq.)   BTDA (2.084 eq.)   DFNA (2 eq.)

↓ 200–250° C.

(Imidized oligomer)

↓ 300° C.

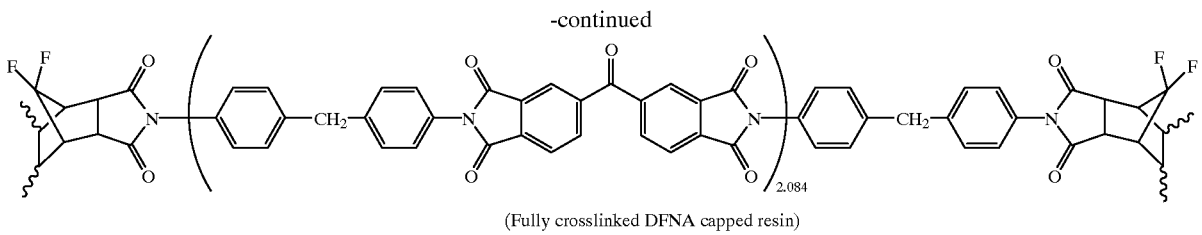

(Fully crosslinked DFNA capped resin)

EXAMPLE 5

Imidized 1500 molecular weight molding powders and crosslinked neat resin disk from 3,6-diphenylcyclohex-4ene-1,2-dicarboxylic anhydride, DPCNA. Following the same procedure as Example 1, molding powders and crosslinked neat resins can be systhesized starting with DPCNA (6.09 g, 20 mmole) in place of the HNA.

EXAMPLE 6

Imidized 1500 molecular weight molding powders and crosslinked neat resin disk from 3,6-diphenylcyclohex-4-ene-1,2-dicarboxylic monomethyl ester acid, DPCNE. Following the same procedure as Example 2, molding powders and crosslinked neat resins can be systhesized starting with DPCNA (6.09 g, 20 mmole) in place of the HNE. The following illustrates the polymerization:

fabrication of PMR polyimides and the use thereof in the preparation of prepregs and composites by providing improved and consistent processability.

While this invention has been described by a number of specific examples, it is obvious that there are other variations and modifications that can be made without departing from the spirit and scope of the invention as set forth in the appended claims.

The invention claimed:

1. Polyimides having improved thermal-oxidative stability derived from the polymerization of effective amounts of at least one polyamine, at lease one tetracarboxylic dianhydride and a dicarboxylic endcap having a formula selected from the group consisting of:

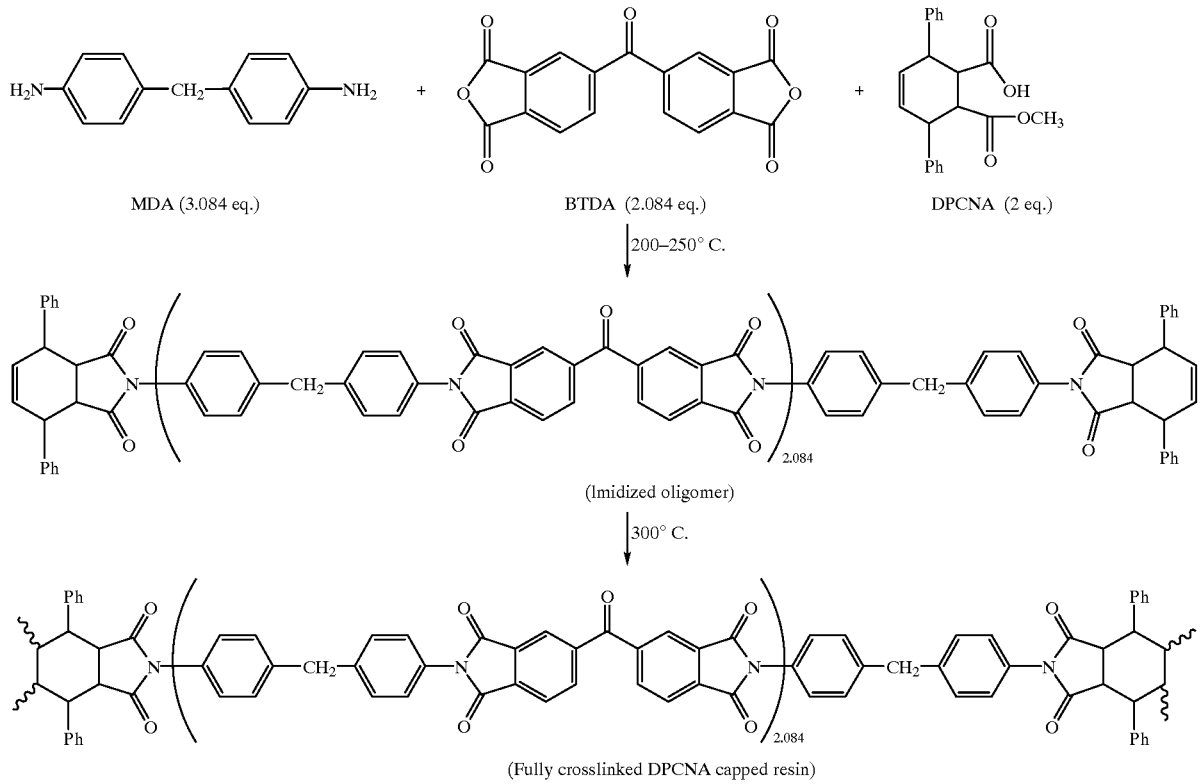

(Fully crosslinked DPCNA capped resin)

The polyimides of this invention particularly underscores the importance of PMR resins to the aerospace industry and the benefits of using this novel class of carboxylic endcaps in current PMR systems. This invention represents a significant advancement in simplifying the manufacture and

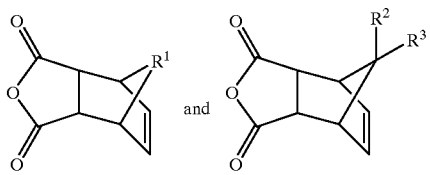

wherein
R¹ is selected from the group consisting of

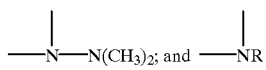

where R is either hydrogen or an alkyl radical of 1 to 4 carbons,
R² is selected from the group consisting of —OH, NH₂, F and Cl radicals, and
R³ is selected from the group consisting of H, OH, NH₂, F, Cl and lower alkylene radicals.

2. A process of preparing polyimides having improved oxidative-stability which comprises polymerizing effective amounts of at least one polyamine with at least one tetracarboxylic dianhydride and a dicarboxylic endcap having a formula selected from the group consisting of:

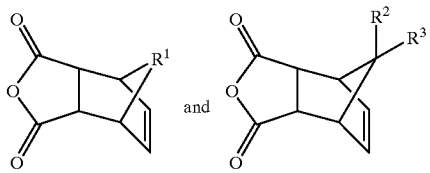

wherein
R¹ is selected from the group consisting of

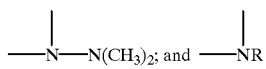

where R is either hydrogen or an alkyl radical of 1 to 4 carbons,
R² is selected from the group consisting of —OH, NH₂, F and Cl radicals, and
R³ is selected from the group consisting of H, OH, NH₂, F, Cl and lower alkylene radicals.

3. Polyimides having improved thermal-oxidative stability derived from the polymerization of effective amounts of at least one polyamine, at lease one tetracarboxylic dianhydride and 7-hydroxy-5-norbornene-2,3-dicarboxylic anhydride.

4. Polyimides having improved thermal-oxidative stability derived from the polymerization of effective amounts of at least one polyamine, at lease one tetracarboxylic dianhydride and 7-hydroxy-5-norbornene-2,3-dicarboxylic monomethyl ester-acid.

5. Polyimides having improved thermal-oxidative stability derived from the polymerization of effective amounts of at least one polyamine, at lease one tetracarboxylic dianhydride and 7,7-diflouro-5-norbornene-2,3-dicarboxylic monomethyl ester-acid.

6. Polyimides having improved thermal-oxidative stability derived from the polymerization of effective amounts of at least one polyamine, at lease one tetracarboxylic dianhydride and 7,7-dihydroxy-5-norbornene-2,3-dicarboxylic anhydride.

7. Polyimides having improved thermal-oxidative stability derived from the polymerization of effective amounts of at least one polyamine, at lease one tetracarboxylic dianhydride and 7,7-diamine-5-norbornene-2,3-dicarboxylic monomethyl ester-acid.

8. Polyimides having improved thermal-oxidative stability derived from the polymerization of effective amounts of at least one polyamine, at least one tetracarboxylic dianhydride and a dicarboxylic endcap having a formula selected from the group consisting of:

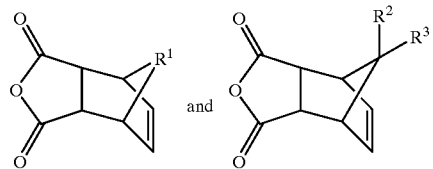

wherein
R¹ is selected from the group consisting of

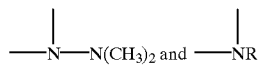

where R is either hydrogen or an alkyl radical of 1 to 4 carbons,
R² is selected from the group consisting of —OH, NH₂, F and Cl radicals,
R³ is selected from the group consisting of H, OH, NH₂, F, Cl, and lower alkylene radicals and either R² or R³ is a NH₂ radical.

9. Polyimides having improved thermal-oxidative stability derived from the polymerization of effective amounts of at least one polyamine, at least one tetracarboxylic dianhydride and a dicarboxylic endcap having a formula selected from the group consisting of:

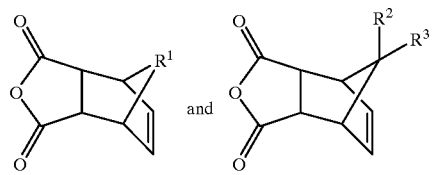

wherein
R¹ is selected from the group consisting of

where R is either hydrogen or an alkyl radical of 1 to 4 carbons,
R² is selected from the group consisting of —OH, NH₂, F and Cl radicals,
R³ is selected from the group consisting of H, OH, NH₂, F, Cl, and lower alkylene radicals and either R² or R³ is a lower alkylene radical.

10. Polyimides having improved thermal-oxidative stability derives from the polymerization of effective amounts of at least one polyamine, at least one tetracarboxylic dianhydride and a dicarboxylic endcap having a formula selected from the group consisting of:

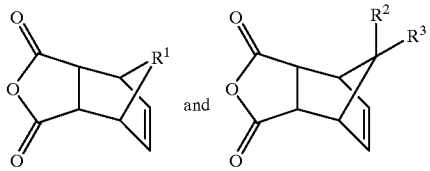

wherein
R¹ is

where R is an alkyl radical of 1 to 4 carbons,
R² is selected from the group consisting of —OH, NH₂, F and Cl radicals, and
R³ is selected from the group consisting of H, OH, NH₂, F, Cl and lower alkylene radicals.

11. Polyimides having improved thermal-oxidative stability derives from the polyamerization of effective amounts of at least one polyamine, at least one tetracarboxylic dianhydride and a dicarboxylic endcap having a formula selected from the group consisting of:

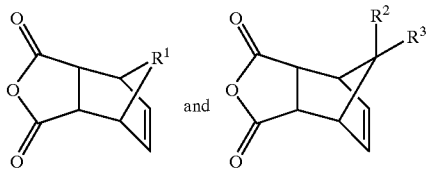

wherein
R¹ is

where R is methyl,
R² is selected from the group consisting of —OH, NH₂, F and Cl radicals, and
R³ is selected from the group consisting of H, OH, NH₂, F, Cl and lower alkylene radicals.

12. Polyimides having improved thermal-oxidative stability derives from the polymerization of effective amounts of at least one polyamine, at least one tetracarboxylic dianhydride and a dicarboxylic endcap having a formula selected from the group consisting of:

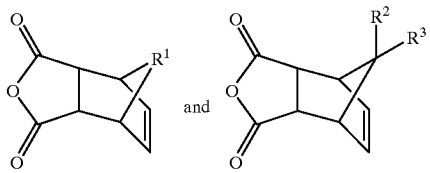

wherein
R¹ is

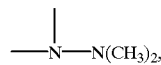

R² is selected from the group consisting of —OH, NH₂, F and Cl radicals, and
R³ is selected from the group consisting of H, OH, NH₂, F, Cl and lower alkylene radicals.

13. Polyimides having improved thermal-oxidative stability derives from the polymerization of effective amounts of at least one polyamine, at least one tetracarboxylic dianhydride and a dicarboxylic endcap having a formula selected from the group consisting of:

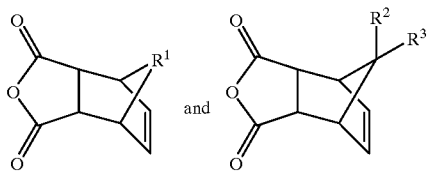

wherein
R¹ is

where R is H,
R² is selected from the group consisting of —OH, NH₂, F and Cl radicals, and
R³ is selected from the group consisting of H, OH, NH₂, F, Cl and lower alkylene radicals.

14. Polyimides having improved thermal-oxidative stability derives from the polymerization of effective amounts of at least one polyamine, at least one tetracarboxylic dianhydride and a dicarboxylic endcap having a formula selected from the group consisting of:

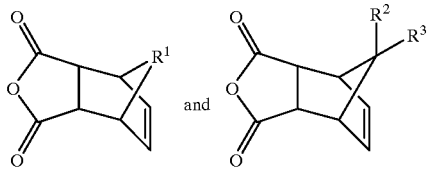

wherein
R¹ is

where R is an alkyl radical of 1 to 4 carbons,
R² is selected from the group consisting of —OH, NH₂, F and Cl radicals, and
R³ is selected from the group consisting of H, OH, NH₂, F, Cl and lower alkylene radicals and where R² and R³ are the same radicals.

15. The polyimides of claim 14 wherein R² and R³ are different radicals.

16. The polyamides of claim 10 wherein $R^2$ is $NH_2$ and $R^3$ is OH.

17. The polyimides of claim 10 wherein $R^2$ and $R^3$ are Cl radicals.

18. A process of preparing polyimides having improved oxidative-stability which comprises polymerizing effective amounts of at least one polyamine with at least one tetra-carboxylic dianhydride and a dicarboxylic endcap having a formula selected from the group consisting of:

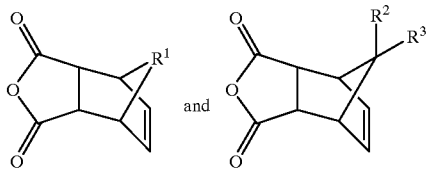

wherein $R^1$ is selected from the group consisting of —N—N($CH_3)_2$ and

where R is either hydrogen or an alkyl radical of 1 to 4 carbons, $R^2$ is selected from the group consisting of —OH, $NH_2$, F and Cl radicals, $R^3$ is selected from the group consisting of H, OH, $NH_2$, F, Cl and lower alkylene radicals, wherein N moles of the tetracarboxylic dianhydride, N+1 moles of the diamine and 2.0 moles of the dicarboxylic endcap are polymerized with the value of N ranging from 2 to 30.

19. The process of claim 18 where $R^2$ and $R^3$ are different radicals.

20. The process of claim 18 wherein $R^2$ and $R^3$ are the same radicals.

21. The process of claim 18 wherein the polyamine is a mixture of more than one aromatic diamine.

22. The process of claim 18 wherein the polyimides are derived from at least two aromatic polyamines and at least two tetracarboxylic dianhydrides.

* * * * *